(12) United States Patent
Kuehner

(10) Patent No.: US 11,465,583 B2
(45) Date of Patent: Oct. 11, 2022

(54) PRODUCING A FORCE TO BE APPLIED TO A SEATBELT IN RESPONSE TO A DECELERATION OF A VEHICLE

(71) Applicant: Toyota Research Institute, Inc., Los Altos, CA (US)

(72) Inventor: Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/167,514

(22) Filed: Feb. 4, 2021

(65) Prior Publication Data

US 2022/0242362 A1 Aug. 4, 2022

(51) Int. Cl.
*B60R 22/34* (2006.01)
*B60R 22/343* (2006.01)
*B60R 22/46* (2006.01)

(52) U.S. Cl.
CPC ........ *B60R 22/3413* (2013.01); *B60R 22/343* (2013.01); *B60R 2022/4685* (2013.01)

(58) Field of Classification Search
CPC ... B60R 22/3413; B60R 22/34; B60R 22/343; B60R 2022/4685; B60R 2022/208; B60R 22/20; B60R 22/19; B60R 22/18
See application file for complete search history.

(56) References Cited

U.S. PATENT DOCUMENTS

| 8,240,736 B2 | 8/2012 | Coenen |
| 9,045,105 B2 | 6/2015 | Khaitan |
| 9,744,940 B1 | 8/2017 | Kohindorfer et al. |
| 10,245,987 B2 | 4/2019 | Castillo et al. |

(Continued)

FOREIGN PATENT DOCUMENTS

| CN | 110108396 A | 8/2019 | |
| DE | 102015113644 A1 * | 3/2016 | ............. B60K 35/00 |
| WO | WO-2008058846 A1 * | 5/2008 | ............. B60R 22/12 |

OTHER PUBLICATIONS

Bose, DMS Fiber Belt, May 22, 2008, EPO, WO 2008058846 A1, Machine Translation of Description (Year: 2008).*

(Continued)

*Primary Examiner* — James A English
*Assistant Examiner* — Matthew D Lee
(74) *Attorney, Agent, or Firm* — Christopher G. Darrow; Darrow Mustafa PC

(57) ABSTRACT

A force to be applied to a seatbelt in response to a deceleration of a vehicle can be produced. Information about the deceleration of the vehicle can be received. A cause of the deceleration can be other than in response to a collision of the vehicle with an object. In response to a receipt of the information, a signal to control an actuator to produce the force can be produced. The actuator can be different from any of a pretensioner of a seatbelt assembly, a load limiter of the seatbelt assembly, and a locking mechanism of a retractor of the seatbelt assembly. A measure of the force can be proportional to a measure of the deceleration. The force can be sufficient to limit a forward movement of a person wearing the seatbelt to be less than a specific distance. The signal can be caused to be communicated to the actuator.

18 Claims, 5 Drawing Sheets

(56) References Cited

U.S. PATENT DOCUMENTS

| | | | |
|---|---|---|---|
| 2003/0056997 A1* | 3/2003 | Breed | B60N 2/66 177/144 |
| 2004/0068354 A1* | 4/2004 | Tabe | B60R 22/48 701/45 |
| 2005/0114108 A1 | 5/2005 | Cooper et al. | |
| 2005/0156457 A1* | 7/2005 | Breed | B60N 2/067 297/467 |
| 2007/0017726 A1* | 1/2007 | Takemura | B60R 22/46 280/806 |
| 2007/0096447 A1* | 5/2007 | Tabe | B60R 21/017 280/735 |
| 2008/0018953 A1 | 1/2008 | Narimatsu et al. | |
| 2010/0049406 A1* | 2/2010 | Wohltmann | B60T 8/1755 701/45 |
| 2016/0047662 A1 | 2/2016 | Ricci | |
| 2018/0126949 A1* | 5/2018 | Turnwald | B60R 22/48 |
| 2018/0361974 A1* | 12/2018 | Le | B60R 21/01544 |
| 2019/0359169 A1* | 11/2019 | Schutera | B60R 21/015 |
| 2021/0122270 A1* | 4/2021 | Baer | B60N 2/42745 |

OTHER PUBLICATIONS

Hatton, Device and System for Producing Vehicle Device Recording Data, Mar. 3, 2016, EPO, DE 102015113644 A1, Machine Translation of Description (Year: 2016).*

Unknown, "Airbag," last accessed on Jan. 18, 2021, 29 pages, found at https://en.wikipedia.org/wiki/Airbag#Operation.

Eric Schmidt, "A simple training guide for new electric car drivers," Electric Vehicle News, pp. 1-9. Mar. 16, 2017.

Unknown, "Anti-lock braking system," last accessed on Dec. 7, 2020, 16 pages, found at https://en.wikipedia.org/wiki/Anti-lock_braking_system.

Wei Chen, "Development of a friction sensor for robotic manipulation," 193 pages, Sep. 2018.

Karim Nice, "How anti-lock brakes work," HowStuffWorks, pp. 1-4, Aug. 23, 2000.

Unknown, "How electric cars achieve instant torque: AnOverview for grads of mechanic schools," Automotive Training Centres, 5 pages.

Tom Harris, "How Seatbelts Work," HowStuffWorks, 1 page, Apr. 9, 2002.

Unknown "How seat belts work," Montana Driver Education and Training, 2 pages.

Matthew Askari, "This Car Cockpit of the Future Features Joystick Controland No Pedals," Car and Driver, pp. 1-6, Jul. 6, 2018.

Akweli Parker, "What is the purpose of a seatbelt pretensioner?" HowStuffWorks, pp. 1-2, Apr. 17, 2012.

* cited by examiner

PRODUCING A FORCE TO BE APPLIED TO A SEATBELT IN RESPONSE TO A DECELERATION OF A VEHICLE

TECHNICAL FIELD

The disclosed technologies are directed to producing a force to be applied to a seatbelt in response to a deceleration of a vehicle caused by other than in response to a collision of the vehicle with an object.

BACKGROUND

A collision of a vehicle with an object can cause a motion of the vehicle to experience a rapid deceleration from a pre-collision speed. Unfortunately, a motion of a person within a passenger compartment of the vehicle can continue at the pre-collision speed, which may cause a collision of the person with one or more components in the passenger compartment. By restraining a movement of the person, a seatbelt can prevent such a collision of the person with the one or more components in the passenger compartment, which may otherwise cause an injury to the person.

Conventionally, a seatbelt can include two or more pieces of webbing. A first end of a first piece of webbing of the seatbelt can be attached to the vehicle (or a seat) at a first anchor point. A second end of the first piece of webbing can be attached to a buckle. A first end of a second piece of webbing of the seatbelt can be attached to the vehicle (or the seat) at a second anchor point. A second end of the second piece of webbing can be attached to the vehicle (or the seat) at a third anchor point. The second piece of webbing can pass through a loop portion of a latching device of a seatbelt assembly. The latching device can also include a latch plate. The buckle can include a groove into which the latch plate can be inserted. Internally, the buckle can include a male part of a fastener configured to engage with a female part of the fastener on the latch plate.

When the male part of the fastener is engaged with the female part of the fastener, the seatbelt assembly can define a three-point restraint system. A lap portion of the second piece of webbing can be disposed between the first anchor point and the second anchor point and across a pelvic region of a person wearing the seatbelt. A shoulder portion of the second piece of webbing can be disposed between the first anchor point and the third anchor point and across an upper body portion of the person wearing the seatbelt. (Alternatively, each of the lap portion and the shoulder portion can be an independent piece of webbing attached to the latching device without the loop portion.) The person wearing the seatbelt can be defined as having an inner shoulder and an outer shoulder. The inner shoulder can be defined as being nearer to a center of the passenger compartment. The third anchor point can be near to the outer shoulder.

SUMMARY

In an embodiment, a system for producing a force to be applied to a seatbelt can include a processor, a communications device, and a memory. The communications device can be configured to receive information about a deceleration of a vehicle. The memory can store a force calculation module and a communications module. The force calculation module can include instructions that when executed by the processor cause the processor to produce, in response to a receipt of the information, a signal to control an actuator to produce the force. The actuator can be different from any of a pretensioner, a load limiter, and a locking mechanism of a seatbelt assembly. The communications module can include instructions that when executed by the processor cause the signal to be communicated to the actuator.

In another embodiment, a method for producing a force to be applied to a seatbelt can include receiving, by a processor, information about a deceleration of a vehicle. The method can include producing, by the processor and in response to a receipt of the information, a signal to control an actuator to produce the force. The actuator can be different from any of a pretensioner, a load limiter, and a locking mechanism of a seatbelt assembly. The method can include causing, by the processor, the signal to be communicated to the actuator.

In another embodiment, a non-transitory computer-readable medium for producing a force to be applied to a seatbelt can include instructions that when executed by one or more processors cause the one or more processors to receive information about a deceleration of a vehicle. The non-transitory computer-readable medium can include instructions that when executed by the one or more processors cause the one or more processors to produce, in response to a receipt of the information, a signal to control an actuator to produce the force. The actuator can be different from any of a pretensioner, a load limiter, and a locking mechanism of a seatbelt assembly. The non-transitory computer-readable medium can include instructions that when executed by the one or more processors cause the one or more processors to cause the signal to be communicated to the actuator.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
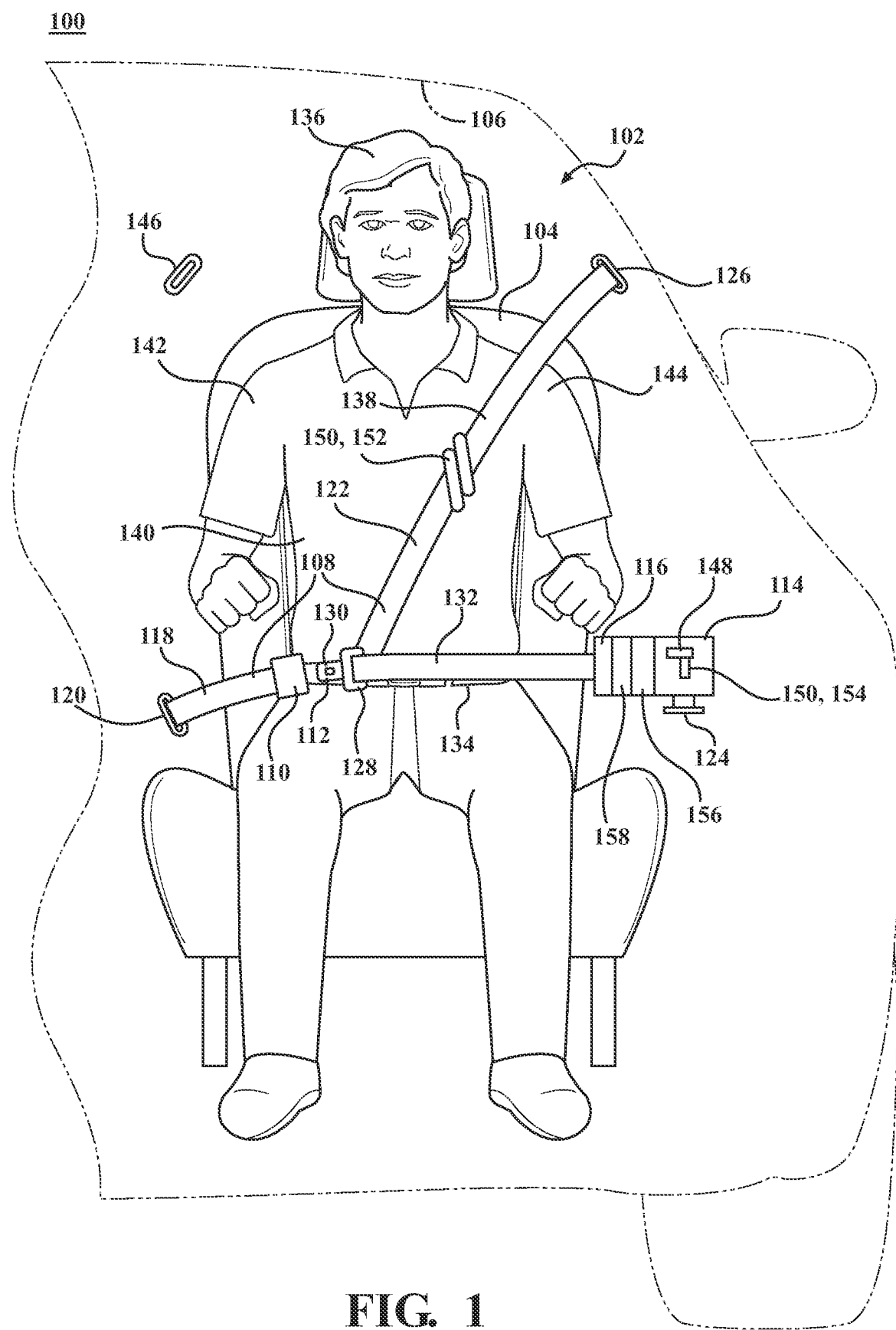
FIG. 1 is a diagram that illustrates an example of an environment of a seatbelt assembly, according to the disclosed technologies.

The disclosed technologies can be used to produce a force to be applied to a seatbelt in response to a deceleration of a vehicle. A processor can receive information about the deceleration of the vehicle. For example, the information about the deceleration can be received from one or more of a sensor for a position of a brake pedal of the vehicle, a sensor for a position of a joystick-like control lever of the vehicle, a sensor for a hydraulic pressure of a brake system of the vehicle, a sensor for a state of the brake system, an accelerometer of the vehicle, an inertial measurement unit of the vehicle, or the like. For example, a cause of the deceleration can be other than in response to a collision of the vehicle with an object. The processor can produce, in response to a receipt of the information, a signal to control an actuator to produce the force to be applied to the seatbelt in response to the deceleration of the vehicle. The processor can cause the signal to be communicated to the actuator. The actuator can be different from any of a pretensioner of a seatbelt assembly, a load limiter of the seatbelt assembly, and a locking mechanism of a retractor of the seatbelt assembly. For example, the actuator can be a motor. For example, a measure of the force can be proportional to a measure of the deceleration. For example, the deceleration can: (1) occur for a duration of time and (2) vary during the duration of time. For example, the force to be applied to the seatbelt can be sufficient to limit a forward movement, in response to the deceleration, of a person wearing the seatbelt to be less than a specific distance. For example, the specific distance can be between a seat of the vehicle in which the person wearing the seatbelt sits and a pointy cervical vertebrae of the person wearing the seatbelt. For example, the specific distance can be three inches.

It is estimated that by 2050 that autonomous vehicles may reduce consumption of fuel by passenger vehicles by 44 percent, and by trucks by 18 percent. To manage the challenges of developing this technology, the Society of Automotive Engineers (SAE) International has specified various levels of driving automation. Specifically, Standard J3016, Taxonomy and Definitions for Terms Related to Driving Automation Systems for On-Road Motor Vehicles, issued by the SAE International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

Additionally, because waste products of a combustion process, used to produce a propulsion force for a conventional vehicle, can include pollutants, efforts have been made to produce the propulsion force through different mechanisms. Among such efforts have been those that can use an electric motor to produce the propulsion force. A vehicle that produces a propulsion force by an internal combustion engine can produce the propulsion force by converting an increasing pressure of a gas, caused by an increasing temperature produced by burning a fossil fuel, into a force that is transferred to a crankshaft and then converting this force into a torque that is transferred through a transmission system before finally being applied to one or more wheels of the vehicle. In contrast, a vehicle that produces a propulsion force by an electric motor can produce the propulsion force by converting an electric current into a torque of a shaft of the electric motor that is applied directly to the one or more wheels of the vehicle.

Because a rate at which a torque is applied to the one or more wheels in response to burning a fossil fuel can be less than a rate at which a torque is applied to the one or more wheels in response to converting an electric current into a torque of a shaft of an electric motor, a rate of acceleration (and deceleration) of a vehicle that produces a propulsion force by an electric motor can be greater than a rate of acceleration (and deceleration) of a vehicle that produces a propulsion force by an internal combustion engine.

Because a motion of a vehicle that produces a propulsion force by an electric motor can be subjected to a rapid deceleration from a pre-deceleration speed, while at a concurrent time a motion of a person within a passenger compartment of the vehicle can continue at the pre-deceleration speed, restraining a movement of the person with a seatbelt may not only prevent an injury that may result from a collision of the person with one or more components in the passenger compartment, but may also prevent the person from experiencing discomfort during the rapid deceleration.

A conventional control system of a vehicle can include, for example, one or more of a subsystem that controls a steering of a set of wheels of the vehicle (e.g., a front set of wheels, a rear set of wheels, or both), a subsystem that controls a brake of one or more wheels of the vehicle, a subsystem that controls a clutch of the vehicle, a subsystem that controls a position of a throttle of the vehicle (e.g., if the vehicle is propelled by an internal combustion engine), a subsystem that controls an amount of current conveyed to an electric motor of the vehicle (e.g., if the vehicle is propelled by an electric motor), or the like. The subsystem that controls the steering can include, for example, a steering operator interface such as a steering wheel, a handlebar, a twin lever steering interface, or the like. The subsystem that controls the brake can include, for example, a brake pedal. The subsystem that controls the clutch can include, for example, a clutch pedal. The subsystem that controls the position of the throttle or the subsystem that controls the amount of current can include, for example, an accelerator pedal.

However, as the degree of driving automation increases, some subsystems of the conventional control system may no longer be necessary. For example, some developers of automobile technologies have proposed that, for a vehicle that meets level 4 of Standard J3016, components of subsystems of a conventional control system, such as a steering operator interface (e.g., a steering wheel, a handlebar, a twin lever steering interface, or the like), the brake pedal, the clutch pedal, and/or the accelerator pedal, can be replaced by a joystick-like control lever. For example, the joystick-like control lever can be configured to cause the vehicle: (1) to accelerate by pulling back on the joystick-like control lever, (2) to brake by pushing forward on the joystick-like control lever, (3) to steer to the left by moving the joystick-like control lever to the left, and (4) to steer to the right by moving the joystick-like control lever to the right. For example, the joystick-like control lever can be disposed between a left front seat of the vehicle and a right front seat of the vehicle so that a person sitting in either seat can control the vehicle.

Because a motion of a vehicle that produces a propulsion force by an electric motor can be subjected to a rapid deceleration from a pre-deceleration speed, while at a concurrent time a motion of a person within a passenger compartment of the vehicle can continue at the pre-deceleration speed, restraining a movement of the person with a seatbelt may not only prevent: (1) an injury that may result from a collision of the person with one or more components in the passenger compartment and (2) the person from experiencing discomfort during the deceleration, but may also reduce a probability that such a movement of the person will cause an inadvertent operation of a joystick-like control lever.

FIG. 1 is a diagram that illustrates an example of an environment 100 of a seatbelt assembly 102, according to the disclosed technologies. For example, the environment 100 can include a seat 104 of a vehicle 106 and the seatbelt assembly 102. The seatbelt assembly 102 can include, for example, a seatbelt 108, a buckle 110, a latching device 112, a retractor 114, and an actuator 116.

The seatbelt 108 can include, for example, two or more pieces of webbing. A first end of a first piece of webbing 118 can be attached to the vehicle 106 (or the seat 104) at a first anchor point 120. A second end of the first piece of webbing 118 of the seatbelt 108 can be attached to the buckle 110. A first end of a second piece of webbing 122 of the seatbelt 108 can be attached to the vehicle 106 (or the seat 104) at a second anchor point 124. A second end of the second piece of webbing 122 can be attached to the vehicle 106 (or the seat 104) at a third anchor point 126. The second piece of webbing 122 can pass through a loop portion 128 of the latching device 112. The latching device 112 can also include a latch plate 130. The buckle 110 can include a groove (not illustrated) into which the latch plate 130 can be inserted. Internally, the buckle 110 can include a male part (not illustrated) of a fastener (not illustrated) configured to engage with a female part (not illustrated) of the fastener (not illustrated) on the latch plate 130.

When the male part of the fastener is engaged with the female part of the fastener, the seatbelt assembly 102 can define a three-point restraint system. A lap portion 132 of the second piece of webbing 122 can be disposed between the first anchor point 120 and the second anchor point 124 and across a pelvic region 134 of a person 136 wearing the seatbelt 108. A shoulder portion 138 of the second piece of webbing 122 can be disposed between the first anchor point 120 and the third anchor point 126 and across an upper body portion 140 of the person 136 wearing the seatbelt 108. (Alternatively, each of the lap portion 132 and the shoulder portion 138 can be an independent piece of webbing attached to the latching device 112 without the loop portion 128.) The person 136 wearing the seatbelt 108 can be defined as having an inner shoulder 142 and an outer shoulder 144. The inner shoulder 142 can be defined as being nearer to a center of a passenger compartment of the vehicle 106. The third anchor point 126 can be near to the outer shoulder 144.

Alternatively, for example, the two or more pieces of webbing of the seatbelt 108 can be configured so that the seatbelt assembly 102 can define a four-point restraint system with an end of one of the two or more pieces of webbing attached to the vehicle 106 (or the seat 104) at a fourth anchor point 146. For example, the fourth anchor point 146 can be near to the inner shoulder 142.

The retractor 114 can be configured to cause a portion of the second piece of webbing 122 to coil around a spool to remove a slack in the second piece of webbing 122 when the person 136 wears the seatbelt 108. Typically, the retractor 114 can be disposed near to the second anchor point 124. Additionally or alternatively, the retractor 114 can be disposed near to the first anchor point 120 or the third anchor point 126 (or the fourth anchor point 146).

Additionally, for example, the retractor 114 can include a locking mechanism 148. For example, the locking mechanism 148 can be configured to prevent the second piece of webbing 122 from uncoiling in response to a deceleration of the vehicle 106 in response to a collision of the vehicle 106 with an object. For example, a first type of the locking mechanism 148 can be configured to prevent the second piece of webbing 122 from uncoiling in response to a rapid decrease in a speed of the vehicle 106. For example, a second type of the locking mechanism 148 can be configured to prevent the second piece of webbing 122 from uncoiling in response to a rapid increase in a speed of an uncoiling of the second piece of webbing 122.

Additionally, for example, the seatbelt assembly 102 can include a load limiter 150. For example, the load limiter 150 can be configured to allow a specific length of the second piece of webbing 122 to uncoil in response to a deceleration of the vehicle 106 in response to a collision of the vehicle 106 with an object. Allowing the specific length of the second piece of webbing 122 to uncoil in response to such a collision may reduce an extent of an injury to the person 136 caused by the second piece of webbing 122. For example, a first type of the load limiter 150 can be a fold 152 formed in the second piece of webbing 122. For example, the fold 152 can be opened in response to the deceleration of the vehicle 106 in response to the collision of the vehicle 106 with the object. For example, a second type of the load limiter 150 can be a torsion bar 154 included in the retractor 114 and attached to the locking mechanism 148. For example, the torsion bar 154 can deform, in response to the deceleration of the vehicle 106 in response to the collision of the vehicle 106 with the object, so that the specific length of the second piece of webbing 122 can uncoil.

Additionally, for example, the seatbelt assembly 102 can include a pretensioner 156. For example, the pretensioner 156 can be configured to ignite, in response to a deceleration of the vehicle 106 in response to a collision of the vehicle 106 with an object, a small explosive charge to produce a force on a piston to cause a portion of the second piece of webbing 122 to coil around a spool (not illustrated) of the retractor 114 to remove a slack in the second piece of webbing 122. Typically, the pretensioner 156 can be disposed near to the second anchor point 124. Additionally or alternatively, the pretensioner 156 can be disposed near to the first anchor point 120 or the third anchor point 126 (or the fourth anchor point 146).

Additionally, for example, the seatbelt assembly 102 can include a motor 158. For example, the motor 158 can be configured to tighten, in response to an initiation of motion of the vehicle 106, the seatbelt 108 to the person 136 wearing the seatbelt 108. Typically, the motor 158 can be disposed near to the second anchor point 124. Additionally or alternatively, the motor 158 can be disposed near to the first anchor point 120 or the third anchor point 126 (or the fourth anchor point 146).

The actuator 116 can be configured to produce, in response to a receipt of a signal, a force to be applied to the seatbelt 108 in response to a deceleration of the vehicle 106. For example, a cause of the deceleration can be other than in response to a collision of the vehicle 106 with an object. For example, a measure of the force can be proportional to a measure of the deceleration. For example, the deceleration can: (1) occur for a duration of time and (2) vary during the duration of time. For example, the force to be applied to the seatbelt 108 can be sufficient to limit a forward movement, in response to the deceleration, of the person 136 wearing the seatbelt 108 to be less than a specific distance. For example, the specific distance can be between the seat 104 and a pointy cervical vertebrae of the person 136. For example, the specific distance can be three inches. For example, the actuator 116 can include the motor 158. The actuator 116 can be disposed near to the second anchor point 124. Additionally or alternatively, the actuator 116 can be disposed near to the first anchor point 120 or the third anchor point 126 (or the fourth anchor point 146).

Figure 2:
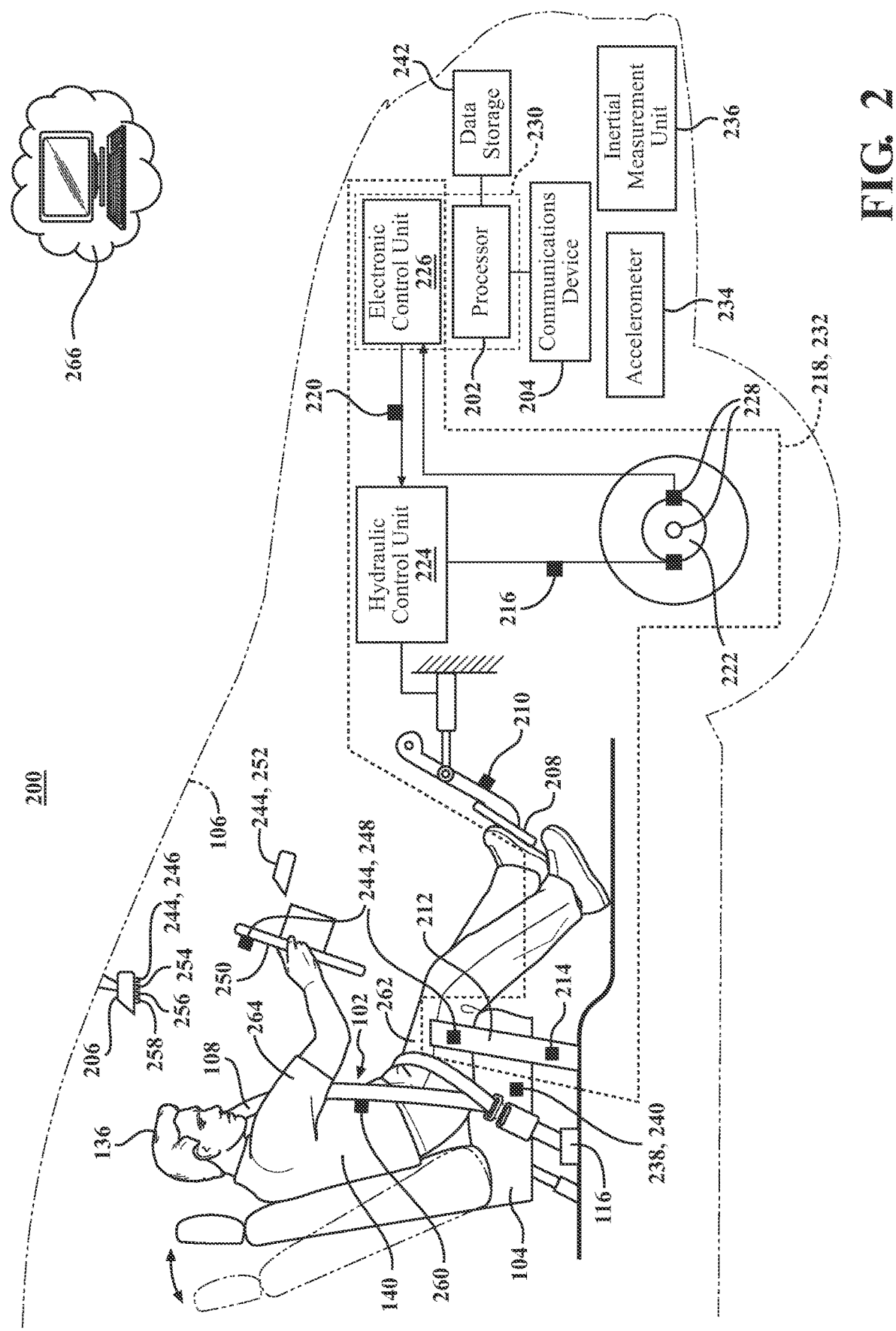
FIG. 2 is a diagram that illustrates an example of an environment for producing a force to be applied to a seatbelt, according to the disclosed technologies.

FIG. 2 is a diagram that illustrates an example of an environment 200 for producing a force to be applied to the seatbelt 108, according to the disclosed technologies. For example, the environment 200 can include the vehicle 106 and the person 136. Additionally, for example, the environment 200 can include a cloud computing platform 266.

The vehicle 106 can include, for example, the seat 104, the seatbelt assembly 102, a processor 202, a communications device 204, and a rearview mirror 206.

Additionally, for example, the vehicle 106 can include a brake pedal 208 and a sensor 210 for a position of the brake pedal 208. Additionally or alternatively, for example, the vehicle 106 can include a joystick-like control lever 212 and a sensor 214 for a position of the joystick-like control lever 212. Additionally or alternatively, for example, the vehicle 106 can include a sensor 216 for a hydraulic pressure of a brake system 218. Additionally or alternatively, for example, the vehicle 106 can include a sensor 220 for a state of the brake system 218.

For example, the brake system 218 can include a brake 222, a hydraulic control unit 224, an electronic control unit 226, a speed sensor 228, the sensor 216 for the hydraulic pressure of the brake system 218, the sensor 220 for the state of the brake system 218, and one or more of the brake pedal 208 or the joystick-like control lever 212. For example, the processor 202 and the electronic control unit 226 can be combined in an electronic control module 230. For example, the brake system 218 can be an anti-lock brake system 232. For example, the anti-lock brake system 232 can include one or more of the sensor 210 for the position of the brake pedal 208 or the sensor 214 for the position of the joystick-like control lever 212.

Additionally or alternatively, for example, the vehicle 106 can include an accelerometer 234. Additionally or alternatively, for example, the vehicle 106 can include an inertial measurement unit 236.

Additionally, for example, the vehicle 106 can include a sensor 238 for information about a measure associated with a mass of the person 136. For example, the sensor 238 can be a seat occupancy sensor 240. Alternatively, for example, the sensor 238 can be configured to produce a measure of the mass of the person 136 that is more accurate than a measure produced by the seat occupancy sensor 240.

Additionally or alternatively, for example, the vehicle 106 can include a data store 242 configured to store information about the person 136.

Additionally or alternatively, for example, the vehicle 106 can include a biometric system 244 configured to determine an identity of the person 136. For example, the biometric system 244 can include an iris recognition device 246. For example, the iris recognition device 246 can be incorporated into the rearview mirror 206. Additionally or alternatively, for example, the biometric system 244 can include a fingerprint scanner 248. For example, the fingerprint scanner 248 can be embedded in one or more of the joystick-like control lever 212 or a steering wheel 250. Additionally or alternatively, for example, the biometric system 244 can include an interface 252 configured to receive a personal identification number.

Additionally or alternatively, for example, the vehicle 106 can include a camera 254 facing toward the person 136. Additionally or alternatively, for example, the vehicle 106 can include a lidar device 256 facing toward the person 136. For example, the lidar device 256 can be an infrared lidar device. Additionally or alternatively, for example, the vehicle 106 can include an ultrasonic range detector 258.

The seatbelt assembly 102 can include, for example, the seatbelt 108 and the actuator 116. Additionally, for example, a tactile sensor 260 can be disposed on the seatbelt 108.

The person 136 can include, for example, the upper body portion 140 and a lower body portion 262. The person 136 can be wearing, for example, clothing 264.

Although the seat 104 illustrated in FIG. 2 can be a seat of the vehicle 106 in which an operator of the vehicle 106 sits, the disclosed technologies are not limited to producing a force to be applied to the seatbelt 108 associated with the seat 104 in which the operator of the vehicle 106 sits. Rather, the disclosed technologies are applicable to producing a force to be applied to a seatbelt associated with any seat of the vehicle 106.

Figure 3:
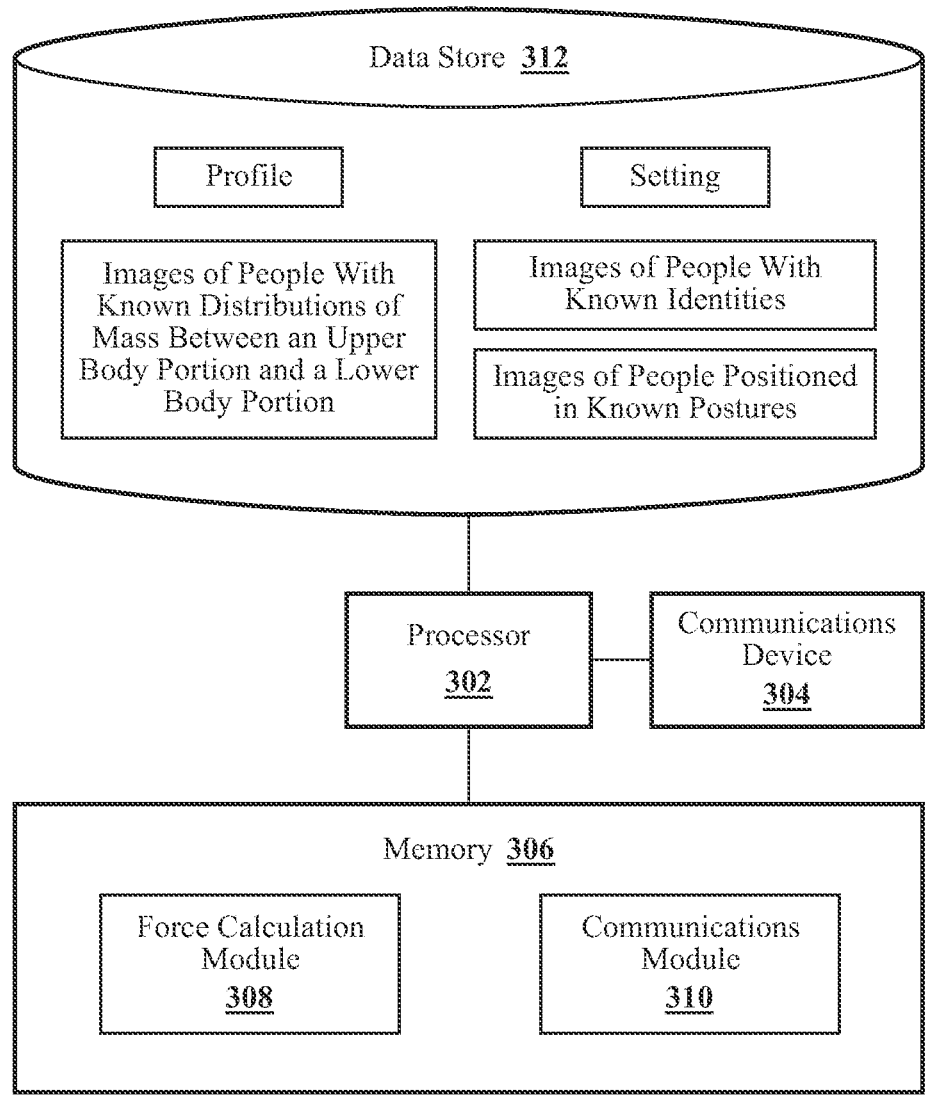
FIG. 3 is a block diagram that illustrates an example of a system for producing the force to be applied to the seatbelt, according to the disclosed technologies.

FIG. 3 is a block diagram that illustrates an example of a system 300 for producing a force to be applied to a seatbelt, according to the disclosed technologies. The system 300 can include, for example, a processor 302, a communications device 304, and a memory 306. For example, the processor 302 can be the processor 202. For example, the seatbelt can be the seatbelt 108.

For example, the communications device 304 can be the communications device 204. The communications device 304 can be communicably coupled to the processor 302. The communications device 304 can be configured to receive information about a deceleration of a vehicle. For example, the vehicle can be the vehicle 106. For example, the communications device 304 can be configured to receive the information about the deceleration of the vehicle by receiving the information about the deceleration of the vehicle from one or more of a sensor for a position of a brake pedal of the vehicle, a sensor for a position of a joystick-like control lever of the vehicle, a sensor for a hydraulic pressure of a brake system of the vehicle, a sensor for a state of the brake system, an accelerometer of the vehicle, an inertial measurement unit of the vehicle, or the like. For example, the information about the deceleration of the vehicle received from one or more of the sensor for the position of the brake pedal or the sensor for the position of the joystick-like control lever can be a command to the brake system to cause the vehicle to decelerate. Advantageously, such information can be received by the communications device 304 in anticipation of an actual deceleration of the vehicle. Likewise, for example, advantageously, the information about the deceleration of the vehicle received from one or more of the sensor for the hydraulic pressure of the brake system or the sensor for the state of the brake system can be received by the communications device 304 in anticipation of the actual deceleration of the vehicle. For example, the sensor for the position of the brake pedal of the vehicle can be the sensor 210 for the position of the brake pedal 208. For example, the sensor for the position of the joystick-like control lever of the vehicle can be the sensor 214 for the position of the joystick-like control lever 212. For example, the sensor for the hydraulic pressure of the brake system of the vehicle can be the sensor 216 for the hydraulic pressure of the brake system 218. For example, the sensor for a state of the brake system can be the sensor 220 for the state of the brake system 218. For example, the accelerometer of the vehicle can be the accelerometer 234. For example, the inertial measurement unit of the vehicle can be the inertial measurement unit 236.

The memory 306 can be communicably coupled to the processor 302. For example, the memory 306 can store a force calculation module 308 and a communications module 310. The force calculation module 308 can include instructions that function to control the processor 302 to produce, in response to a receipt of the information about the deceleration of the vehicle, a signal to control an actuator to produce the force to be applied to the seatbelt. The communications module 310 can include instructions that function to control the processor 302 to cause the signal to be communicated to the actuator.

For example, a cause of the deceleration can be other than in response to a collision of the vehicle with an object. For example, the deceleration can be a routine deceleration and the cause of the deceleration can be a routine operation of the vehicle. For example, a measure of the force to be applied to the seatbelt can be proportional to a measure of the deceleration. For example, the deceleration can: (1) occur for a duration of time and (2) vary during the duration of time. For example, the force to be applied to the seatbelt can be sufficient to limit a forward movement, in response to the deceleration, of a person wearing the seatbelt to be less than a specific distance. For example, the person can be the person 136. For example, the specific distance can be between a seat of the vehicle in which the person wearing the seatbelt sits and a pointy cervical vertebrae of the person wearing the seatbelt. For example, the specific distance can be three inches.

For example, the actuator can be different from any of a pretensioner of a seatbelt assembly, a load limiter of the seatbelt assembly, and a locking mechanism of a retractor of the seatbelt assembly. For example: (1) the seatbelt assembly can be the seatbelt assembly 102, (2) the pretensioner can be the pretensioner 156, (3) the load limiter can be the load limiter 150, (4) the locking mechanism can be the locking mechanism 148, and (5) the retractor can be the retractor 114. For example, the actuator can be the actuator 116. For example, the actuator can be a motor. For example, the motor can be further configured to tighten, in response to an initiation of a motion of the vehicle, the seatbelt to a person wearing the seatbelt. For example, the actuator can include the motor 158.

In a first implementation, the processor 302 can be configured to obtain information about a measure associated with a mass of a person wearing the seatbelt. The measure of the force to be applied to the seatbelt can be proportional to a measure of the deceleration and the measure associated with the mass of the person.

For example, the processor 302 can be configured to obtain the information about the measure associated with the mass of the person by receiving, from a sensor disposed on the vehicle, the information about the measure associated with the mass of the person. For example, the sensor can be the sensor 238. For example, the sensor 238 can be the seat occupancy sensor 240. For example, in response to a receipt of a signal, indicative that a person is occupying the seat, received from the seat occupancy sensor 240, the processor 302 can produce a signal to control the actuator to produce the force to be applied to the seatbelt in which the measure of the force is proportional to the measure of the deceleration and an average mass of a person. Alternatively, for example, the sensor can be configured to produce a measure of the mass of the person that is more accurate than a measure produced by the seat occupancy sensor 240. For example, the sensor can determine an actual mass of the person that is occupying the seat.

Additionally or alternatively, for example, the system 300 can further include a data store 312 disposed on the vehicle. For example, the data store 312 can be the data store 242. The processor 302 can be configured to obtain the information about the measure associated with the mass of the person by retrieving, from the data store 312, the information about the measure associated with the mass of the person. For example, a profile of the person can be stored in the data store 312. For example, the profile can include information about a gender of the person, a mass of the person, or the like. For example, in response to a receipt of the information about the gender of the person, the processor 302 can produce a signal to control the actuator to produce the force to be applied to the seatbelt in which the measure of the force is proportional to the measure of the deceleration and an average mass of a person of that gender.

Additionally or alternatively, for example, the communications device 304 can be disposed on the vehicle. The processor 302 can be configured to obtain the information about the measure associated with the mass of the person by receiving, from a cloud computing platform via the communications device 304, the information about the measure associated with the mass of the person. For example, the cloud computing platform can be the cloud computing platform 266. For example, a profile of the person can be stored in the cloud computing platform. For example, the profile can include information about a gender of the person, a mass of the person, or the like.

For example, the information about the measure associated with the mass of the person can include information about a distribution of the mass between an upper body portion of the person and a lower body portion of the person. For example: (1) the upper body portion of the person can be the upper body portion 140 and (2) the lower body portion of the person can be the lower body portion 262. As described above, a motion of the vehicle can be subjected to a rapid deceleration from a pre-deceleration speed while at a concurrent time a motion of the person can continue at the pre-deceleration speed. However, when the person is wearing a conventional seatbelt, the motion of the person that continues at the pre-deceleration speed can be principally a motion of the upper body portion of the person. Therefore, for example, in response to a receipt of the information about the measure associated with the mass of the person, including the information about the distribution of the mass between the upper body portion of the person and the lower body portion of the person, the processor 302 can produce a signal to control the actuator to produce the force to be applied to the seatbelt in which the measure of the force is proportional to the measure of the deceleration and information about a measure of the mass of the upper body portion of the person.

For example, the profile of the person, stored in one or more of the data store 312 or the cloud computing platform, can further include the information about the distribution of the mass between the upper body portion of the person and the lower body portion of the person. For example, such information can include information about one or more of a height of the person, a size of a shirt for the person, a measure of a circumference of a neck for a shirt for the person, a measure of a length of a sleeve for the shirt for the person, a length of the shirt for the person, a width of shoulders for the shirt for the person, a width of a chest for the shirt for the person, a size of pants for the person, a length of the pants for the person, a measure of a circumference of a waist for the pants for the person, a measure of a circumference of hips for the pants for the person, a length of an inseam for the pants for the person, a measures of a circumference of an underbust for a bra for the person, a size of a cup for the bra for the person, a size of a shoe for the person, or the like.

Additionally or alternatively, for example, using a camera facing toward the person, the processor 302 can determine the information about the distribution of the mass between the upper body portion of the person and the lower body portion of the person by comparing an image of the person with images of people with known distributions of mass between upper body portions and lower body portions. For example, the images of the people with the known distributions of mass between upper body portions and lower body portions can be stored in one or more of the data store 312 or the cloud computing platform. For example, the camera facing toward the person can be the camera 254.

For example, the processor 302 can be further configured to obtain information associated with an identity of the person wearing the seatbelt. The processor 302 can be configured to obtain the information about the measure associated with the mass of the person by obtaining, in response to a receipt of the information associated with the identity of the person, the information about the measure associated with the mass of the person.

For example, using a biometric system, the processor 302 can obtain the information associated with the identity of the person wearing the seatbelt. For example, the biometric system can be the biometric system 244. For example, the biometric system 244 can include the iris recognition device 246. For example, the iris recognition device 246 can be incorporated into the rearview mirror 206. Additionally or alternatively, for example, the biometric system 244 can include the fingerprint scanner 248. For example, the fingerprint scanner 248 can be embedded in one or more of the joystick-like control lever 212 or the steering wheel 250. Additionally or alternatively, for example, the biometric system 244 can include the interface 252 configured to receive a personal identification number. For example, in response to the person entering the personal identification number of the person into the interface 252, the processor 302 can obtain the information associated with the identity of the person wearing the seatbelt.

Additionally or alternatively, for example, using the camera facing toward the person, the processor 302 can obtain the information associated with the identity of the person wearing the seatbelt by comparing an image of the person with images of people with known identities. For example, the images of the people with the known identities can be stored in one or more of the data store 312 or the cloud computing platform. For example, the camera facing toward the person can be the camera 254.

Additionally, for example, the force to be applied to the seatbelt can be a function of the identity of the person wearing the seatbelt. As described above, because a motion of the vehicle can be subjected to a rapid deceleration from a pre-deceleration speed, while at a concurrent time a motion of the person can continue at the pre-deceleration speed, restraining a movement of the person with the seatbelt may not only prevent an injury that may result from a collision of the person with one or more components in a passenger compartment of the vehicle, but may also prevent the person from experiencing discomfort during the rapid deceleration. An amount of the discomfort can be a matter of personal preference. For example, the amount of the discomfort can be a function of one or more of a degree of the movement of the person, a manner of the movement of the person, or the like. Accordingly, the disclosed technologies can allow, for example, the person to select a setting to control one or more of a degree of the force to be applied to the seatbelt, a manner in which the force is applied to the seatbelt, or the like. For example, the manner in which the force is applied to the seatbelt can include incorporating a duration of time between a first time and a second time. For example, the first time can be a time at which an actual deceleration of the vehicle commences. For example, the second time can be a time at which the communications module 310 causes the signal, to control the actuator to produce the force to be applied to the seatbelt, to be communicated to the actuator. For example, the duration of time can be incorporated so that the second time is a time that is the duration of time after the first time. Alternatively, for example, the duration of time can be incorporated so that the second time is a time that is the duration of time before the first time. For example, the setting can be stored in one or more of the data store 312 or the cloud computing platform.

In a second implementation, the processor 302 can be configured to obtain information about a posture of a person wearing the seatbelt. The measure of the force to be applied to the seatbelt can be proportional to the measure of the deceleration and an adjustment derived from the information about the posture of the person.

For example, the processor 302 can be configured to obtain the information about the posture of the person by receiving, from a sensor disposed on the vehicle, the information about the posture of the person. For example, the sensor can be one or more of a lidar device or an ultrasonic range detector. For example, the lidar device can be an infrared lidar device. For example, the lidar device can be the lidar device 256. For example, the ultrasonic range detector can be the ultrasonic range detector 258.

For example, the posture of the person can be a function of a degree to which the seat is reclined. For example, the seat can be the seat 104. For example, using the sensor, the processor 302 can determine a distance between the person and the sensor. For example, using the distance between the person and the sensor, the processor 302 can determine the degree to which the seat is reclined. For example, using the degree to which the set is reclined, the processor 302 can determine the posture of the person.

Additionally or alternatively, for example, using the camera facing toward the person, the processor 302 can obtain the information about the posture of the person by comparing an image of the person with images of people positioned in known postures. For example, the images of the people positioned in the known postures can be stored in one or more of the data store 312 or the cloud computing platform. For example, the camera facing toward the person can be the camera 254.

Additionally or alternatively, for example, the posture of the person can be a function of a degree of inclination (positive or negative (e.g., uphill or downhill)) of the vehicle. In this example, the adjustment derived from the information about the posture of the person can include an adjustment for the degree of inclination. For example, the adjustment for the degree of inclination can be: (1) a negative adjustment for a positive inclination and (2) a positive adjustment for a negative inclination.

In a third implementation, the processor 302 can be configured to obtain information about a measure of a coefficient of friction between the seatbelt and an item of clothing in contact with the seatbelt. For example, the item of clothing can be the clothing 264. The measure of the force to be applied to the seatbelt can be proportional to the measure of the deceleration and the measure of the coefficient of friction.

For example, the processor 302 can be configured to obtain the information about the measure of the coefficient of friction by obtaining, from a tactile sensor disposed on the seatbelt, the information about the measure of the coefficient of friction. For example, the tactile sensor can be the tactile sensor 260. As described above, because a motion of the vehicle can be subjected to a rapid deceleration from a pre-deceleration speed, while at a concurrent time a motion of the person can continue at the pre-deceleration speed, restraining a movement of the person with the seatbelt may not only prevent an injury that may result from a collision of the person with one or more components in a passenger compartment of the vehicle, but may also prevent the person from experiencing discomfort during the rapid deceleration. An amount of the discomfort can be a matter of personal preference. For example, the amount of the discomfort can be a function of a degree of friction between the seatbelt and the item of clothing in contact with the seatbelt. Accordingly, the disclosed technologies can allow, for example, the force to be applied to the seatbelt to be a function of the measure of the coefficient of friction.

Additionally, although the disclosed technologies have been described with respect to longitudinal deceleration (e.g., braking), the disclosed technologies are not limited to these situations. Rather, the disclosed technologies are also applicable to situations that involve one or more of lateral acceleration or lateral deceleration. For example, a vehicle may experience one or more of lateral acceleration or lateral deceleration when driving through a curve on a road. In these situations, for example, the disclosed technologies can produce a force to be applied to a seatbelt to counter an effect of the one or more of lateral acceleration or lateral deceleration. In these situations, for example, a measure of the force to be applied to the seatbelt can be proportional to a measure of the one or more of lateral acceleration or lateral deceleration and the measure of the coefficient of friction between a fabric of the seat and the item of clothing in contact with the seat.

Figure 4:
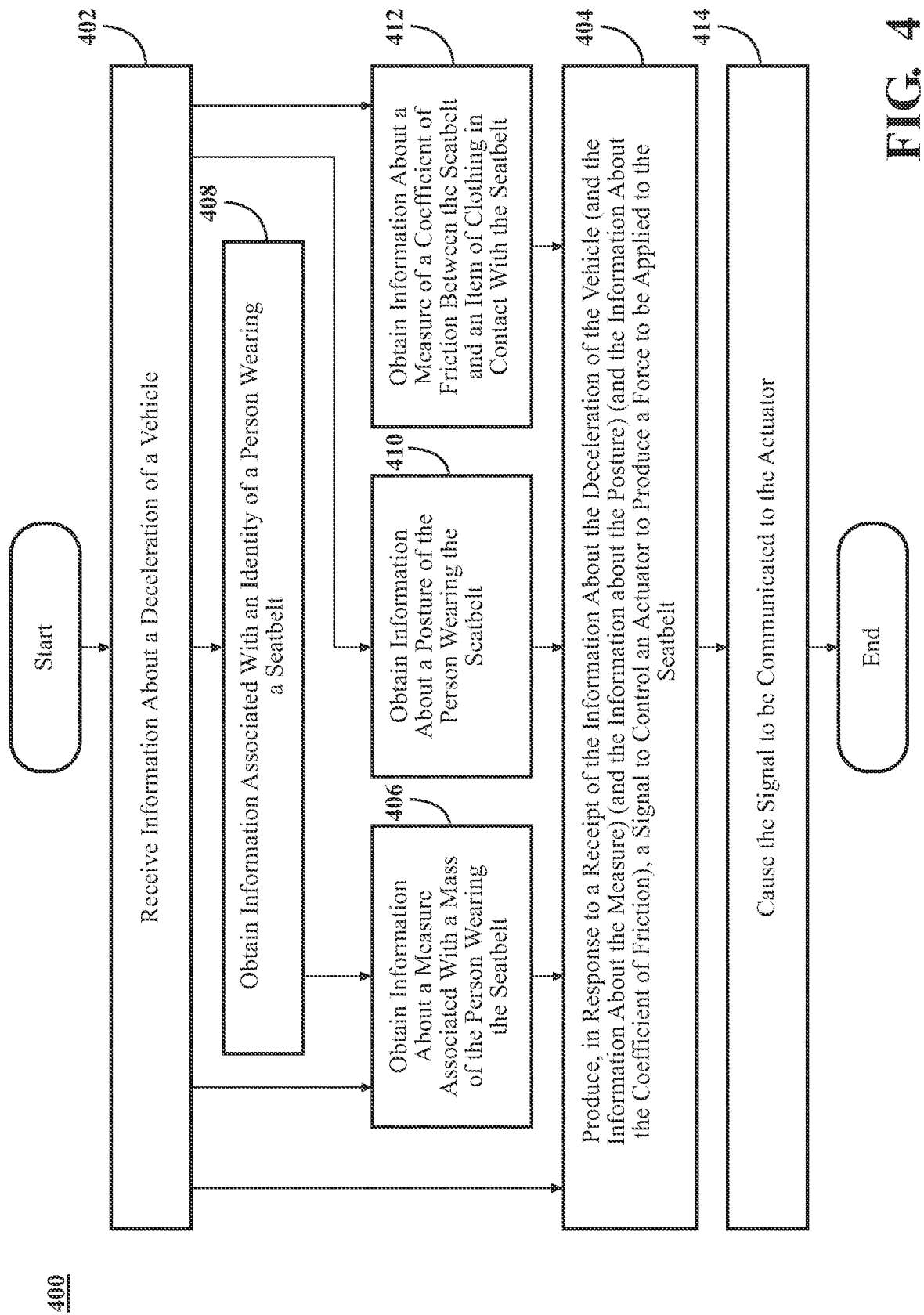
FIG. 4 includes a flow diagram that illustrates an example of a method that is associated with producing a force to be applied to a seatbelt, according to the disclosed technologies.

FIG. 4 includes a flow diagram that illustrates an example of a method 400 that is associated with producing a force to be applied to a seatbelt, according to the disclosed technologies. The method 400 is described from the perspective of the system 300 illustrated in FIG. 3. Although the method 400 is described in combination with the system 300, one of skill in the art understands, in light of the description herein, that the method 400 is not limited to being implemented by the system 300. Rather, the system 300 is an example of a system that may be used to implement the method 400. For example, the method 400 can be performed by an autonomous mobile agent. For example, the autonomous mobile agent can include an autonomous vehicle, a mobile robot, or the like.

In FIG. 4, in the method 400, at an operation 402, the communications device 304 can receive information about a deceleration of a vehicle. For example, the communications device 304 can receive the information about the deceleration of the vehicle by receiving the information about the deceleration of the vehicle from one or more of a sensor for a position of a brake pedal of the vehicle, a sensor for a position of a joystick-like control lever of the vehicle, a sensor for a hydraulic pressure of a brake system of the vehicle, a sensor for a state of the brake system, an accelerometer of the vehicle, an inertial measurement unit of the vehicle, or the like. For example, a cause of the deceleration can be other than in response to a collision of the vehicle with an object.

At an operation 404, the force calculation module 308 can produce, in response to a receipt of the information about the deceleration of the vehicle, a signal to control an actuator to produce the force to be applied to the seatbelt.

For example, a measure of the force to be applied to the seatbelt can be proportional to a measure of the deceleration. For example, the deceleration can: (1) occur for a duration of time and (2) vary during the duration of time. For example, the force to be applied to the seatbelt can be sufficient to limit a forward movement, in response to the deceleration, of a person wearing the seatbelt to be less than a specific distance. For example, the specific distance can be between a seat of the vehicle in which the person wearing the seatbelt sits and a pointy cervical vertebrae of the person wearing the seatbelt. For example, the specific distance can be three inches.

For example, the actuator can be different from any of a pretensioner of a seatbelt assembly, a load limiter of the seatbelt assembly, and a locking mechanism of a retractor of the seatbelt assembly. For example, the actuator can be a motor. For example, the motor can be further configured to tighten, in response to an initiation of a motion of the vehicle, the seatbelt to a person wearing the seatbelt.

In a first implementation, at an operation 406, the processor 302 can obtain information about a measure associated with a mass of a person wearing the seatbelt. In the first implementation, at the operation 404, the measure of the force to be applied to the seatbelt can be proportional to a measure of the deceleration and the measure associated with the mass of the person.

For example, the processor 302 can obtain the information about the measure associated with the mass of the person by receiving, from a sensor disposed on the vehicle, the information about the measure associated with the mass of the person. For example, the sensor can be a seat occupancy sensor. For example, at the operation 404, in response to a receipt of a signal, indicative that a person is occupying the seat, received from the seat occupancy sensor, the processor 302 can produce a signal to control the actuator to produce the force to be applied to the seatbelt in which the measure of the force is proportional to the measure of the deceleration and an average mass of a person. Alternatively, for example, the sensor can be configured to produce a measure of the mass of the person that is more accurate than a measure produced by a seat occupancy sensor. For example, the sensor can determine an actual mass of the person that is occupying the seat.

Additionally or alternatively, for example, the processor 302 can obtain the information about the measure associated with the mass of the person by retrieving, from the data store 312, the information about the measure associated with the mass of the person. For example, a profile of the person can be stored in the data store 312. For example, the profile can include information about a gender of the person, a mass of the person, or the like. For example, at the operation 404, in response to a receipt of the information about the gender of the person, the processor 302 can produce a signal to control the actuator to produce the force to be applied to the seatbelt in which the measure of the force is proportional to the measure of the deceleration and an average mass of a person of that gender.

Additionally or alternatively, for example, the processor 302 can obtain the information about the measure associated with the mass of the person by receiving, from a cloud computing platform via the communications device 304, the information about the measure associated with the mass of the person. For example, a profile of the person can be stored in the cloud computing platform. For example, the profile can include information about a gender of the person, a mass of the person, or the like.

For example, the information about the measure associated with the mass of the person can include information about a distribution of the mass between an upper body portion of the person and a lower body portion of the person. As described above, a motion of the vehicle can be subjected to a rapid deceleration from a pre-deceleration speed while at a concurrent time a motion of the person can continue at the pre-deceleration speed. However, when the person is wearing a conventional seatbelt, the motion of the person that continues at the pre-deceleration speed can be principally a motion of the upper body portion of the person. Therefore, for example, at the operation 404, in response to a receipt of the information about the measure associated with the mass of the person, including the information about the distribution of the mass between the upper body portion of the person and the lower body portion of the person, the processor 302 can produce a signal to control the actuator to produce the force to be applied to the seatbelt in which the measure of the force is proportional to the measure of the deceleration and information about a measure of the mass of the upper body portion of the person.

Additionally, for example, in the first implementation, at an operation 408, the processor 302 can obtain information associated with an identity of the person wearing the seatbelt. For example, at the operation 406, in response to a receipt of the information associated with the identity of the person, the processor 302 can obtain the information about the measure associated with the mass of the person.

Additionally, for example, at the operation 404, the force to be applied to the seatbelt can be a function of the identity of the person wearing the seatbelt. As described above, because a motion of the vehicle can be subjected to a rapid deceleration from a pre-deceleration speed, while at a concurrent time a motion of the person can continue at the pre-deceleration speed, restraining a movement of the person with the seatbelt may not only prevent an injury that may result from a collision of the person with one or more components in a passenger compartment of the vehicle, but may also prevent the person from experiencing discomfort during the rapid deceleration. An amount of the discomfort can be a matter of personal preference. For example, the amount of the discomfort can be a function of one or more of a degree of the movement of the person, a manner of the movement of the person, or the like. Accordingly, the disclosed technologies can allow, for example, the person to select a setting to control one or more of a degree of the force to be applied to the seatbelt, a manner in which the force is applied to the seatbelt, or the like. For example, the manner in which the force is applied to the seatbelt can include incorporating a duration of time between a first time and a second time. For example, the first time can be a time at which an actual deceleration of the vehicle commences. For example, the second time can be a time at which the communications module causes the signal, to control the actuator to produce the force to be applied to the seatbelt, to be communicated to the actuator (i.e., at an operation 414). For example, the duration of time can be incorporated so that the second time is a time that is the duration of time after the first time. Alternatively, for example, the duration of time can be incorporated so that the second time is a time that is the duration of time before the first time. For example, the setting can be stored in one or more of the data store 312 or the cloud computing platform.

In a second implementation, at an operation 410, the processor 302 can obtain information about a posture of a person wearing the seatbelt. In the second implementation, at the operation 404, the measure of the force to be applied to the seatbelt can be proportional to the measure of the deceleration and an adjustment derived from the information about the posture of the person. For example, the processor 302 can obtain the information about the posture of the person by receiving, from a sensor disposed on the vehicle, the information about the posture of the person. For example, the sensor can be one or more of a lidar device or an ultrasonic range detector.

In a third implementation, at an operation 412, the processor 302 can obtain information about a measure of a coefficient of friction between the seatbelt and an item of clothing in contact with the seatbelt. In the third implementation, at the operation 404, the measure of the force to be applied to the seatbelt can be proportional to the measure of the deceleration and the measure of the coefficient of friction. For example, the processor 302 can obtain the information about the measure of the coefficient of friction by obtaining, from a tactile sensor disposed on the seatbelt, the information about the measure of the coefficient of friction.

At the operation 414, the communications module can cause the signal to be communicated to the actuator.

Figure 5:
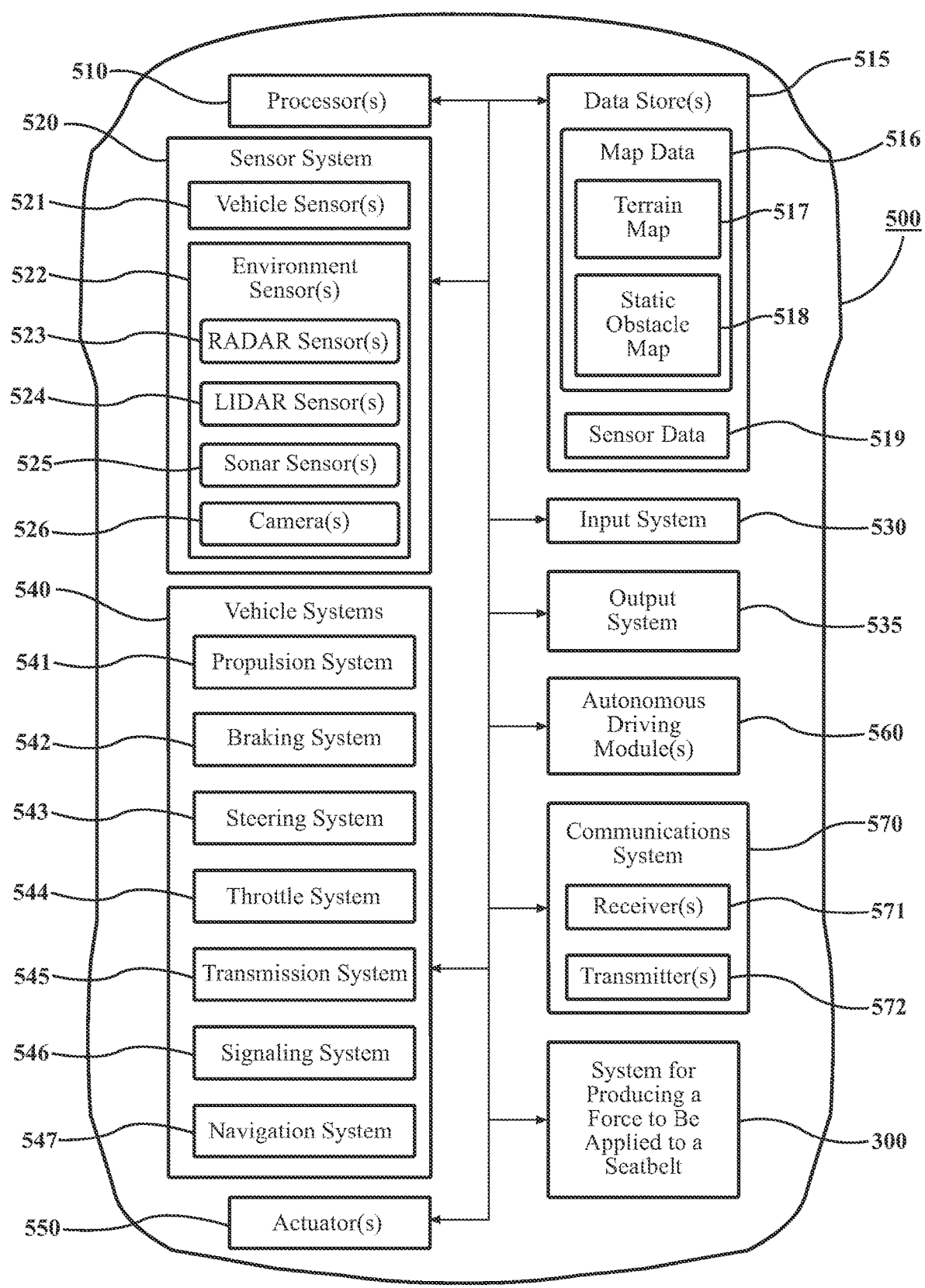
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 300 for producing a force to be applied to a seatbelt.

In one or more arrangements, the one or more processors 510 can be a main processor of the vehicle 500. For example, the one or more processors 510 can be an electronic control unit (ECU). For example, functions and/or operations of the processor 202, the processor 302, or both (illustrated in FIGS. 2 and 3) can be realized by the one or more processors 510.

The one or more data stores 515 can store, for example, one or more types of data. For example, functions and/or operations of the data store 242, the memory 308, the data store 312, or any combination thereof (illustrated in FIGS. 2 and 3) can be realized by the one or more data stores 515. The one or more data store 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. For example, functions and/or operations of the sensor 210, the sensor 214, the sensor 216, the sensor 220, the accelerometer 234, the inertial measurement unit 236, or any combination thereof (illustrated in FIG. 2) can be realized by the one or more vehicle sensors 521. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the lidar device 256 (illustrated in FIG. 2) can be realized by the one or more lidar sensors 524. For example, functions and/or operations of the ultrasonic range detector 258 (illustrated in FIG. 2) can be realized by the one or more sonar sensors 525. For example, functions and/or operations of the camera 254 (illustrated in FIG. 2) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). For example, functions and/or operations of the biometric system 244, the iris recognition device 246, the fingerprint scanner 248, the interface 252, or any combination of the foregoing (illustrated in FIG. 2) can be realized by the input system 530. The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of the brake pedal 208, the joystick-like control lever 212, the brake system 218, or any combination of the foregoing (illustrated in FIG. 2) can be realized by the braking system 542. For example, functions and/or operations of the joystick-like control lever 212, the steering wheel 250, or both (illustrated in FIG. 2) can be realized by the steering system 543. For example, functions and/or operations of the joystick-like control lever 212 (illustrated in FIG. 2) can be realized by the throttle system 544.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators. For example, functions and/or operations of the actuator 116, the pretensioner 156, the motor 158, or any combination of the foregoing (illustrated in FIG. 2) can be realized by the one or more actuators 550.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 204, the communications device 304, or both (illustrated in FIG. 2) can be realized by the communications system 570.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A system, comprising:
    a processor configured to obtain information about a measure associated with a mass of a person wearing a seatbelt and to obtain information associated with an identity of the person wearing the seatbelt, wherein the processor is configured to obtain the information about the measure associated with the mass of the person by obtaining, in response to a receipt of the information associated with the identity of the person, the information about the measure associated with the mass of the person;
    a communications device configured to receive information about a deceleration of a vehicle; and
    a memory storing:
        a force calculation module including instructions that when executed by the processor cause the processor to produce, in response to the information about the deceleration of the vehicle, a signal to control an actuator to produce a force to be applied to the seatbelt, the force being proportional to a measure of the deceleration and the measure associated with the mass of the person, the actuator being different from any of a pretensioner, a load limiter, and a locking mechanism of a seatbelt assembly; and
        a communications module including instructions that when executed by the processor cause the signal to be communicated to the actuator.

2. The system of claim 1, wherein a cause of the deceleration is other than in response to a collision of the vehicle with an object.

3. The system of claim 1, wherein:
    the actuator is a motor; and
    the motor is further configured to tighten, in response to an initiation of a motion of the vehicle, the seatbelt to the person wearing the seatbelt.

4. The system of claim 1 wherein the processor is configured to obtain the information about the measure associated with the mass of the person by receiving, from a sensor disposed on the vehicle, the information about the measure associated with the mass of the person.

5. The system of claim 1 further comprising a data store disposed on the vehicle, wherein the processor is configured to obtain the information about the measure associated with the mass of the person by retrieving, from the data store, the information about the measure associated with the mass of the person.

6. The system of claim 1 wherein the information about the measure associated with the mass of the person includes information about a distribution of the mass between an upper body portion of the person and a lower body portion of the person.

7. The system of claim 1 wherein the force to be applied to the seatbelt is a function of the identity of the person wearing the seatbelt.

8. The system of claim 1, wherein the processor is configured to obtain information about a posture of the person wearing the seatbelt, wherein a measure of the force is proportional to the measure of the deceleration and an adjustment derived from the information about the posture.

9. The system of claim 8, wherein:
    the processor is configured to obtain the information about the posture by receiving, from a sensor disposed on the vehicle, the information about the posture; and
    the sensor comprises at least one of a lidar device or an ultrasonic range detector.

10. The system of claim 1, wherein the communications device is configured to receive the information about the deceleration of the vehicle by receiving the information about the deceleration of the vehicle from at least one of a sensor for a position of a brake pedal of the vehicle, a sensor for a position of a joystick-like control lever of the vehicle, a sensor for a hydraulic pressure of a brake system of the vehicle, a sensor for a state of the brake system, an accelerometer of the vehicle, or an inertial measurement unit of the vehicle.

11. A system, comprising:
    a processor configured to obtain information about a measure associated with a mass of a person wearing a seatbelt by receiving, from a cloud computing platform via a communications device, the information about the measure associated with the mass of the person;
    the communications device disposed on a vehicle and configured to receive information about a deceleration of the vehicle; and
    a memory storing:
        a force calculation module including instructions that when executed by the processor cause the processor to produce, in response to the information about the deceleration of the vehicle, a signal to control an actuator to produce a force to be applied to the seatbelt, the force being proportional to a measure of the deceleration and the measure associated with the mass of the person, the actuator being different from any of a pretensioner, a load limiter, and a locking mechanism of a seatbelt assembly; and
        a communications module including instructions that when executed by the processor cause the signal to be communicated to the actuator.

12. A system, comprising:
    a processor configured to obtain information about a measure of a coefficient of friction between a seatbelt and an item of clothing in contact with the seatbelt;
    a communications device configured to receive information about a deceleration of a vehicle; and
    a memory storing:
        a force calculation module including instructions that when executed by the processor cause the processor to produce, in response to the information about the deceleration of the vehicle, a signal to control an actuator to produce a force to be applied to the seatbelt, a measure of the force being proportional to a measure of the deceleration and the measure of the coefficient of friction, the actuator being different from any of a pretensioner, a load limiter, and a locking mechanism of a seatbelt assembly; and
        a communications module including instructions that when executed by the processor cause the signal to be communicated to the actuator.

13. The system of claim 12, wherein the processor is configured to obtain the information about the measure of the coefficient of friction by obtaining, from a tactile sensor disposed on the seatbelt, the information about the measure of the coefficient of friction.

14. A method, comprising:
    obtaining, by a processor, information associated with an identity of a person wearing a seatbelt;
    obtaining, by the processor and in response to a receipt of the information associated with the identity of the person, information about a measure associated with a mass of the person;

receiving, by the processor, information about a deceleration of a vehicle;

producing, by the processor and in response to the information about the deceleration of the vehicle, a signal to control an actuator to produce a force to be applied to the seatbelt, the force being proportional to a measure of the deceleration and the measure associated with the mass of the person, the actuator being different from any of a pretensioner, a load limiter, and a locking mechanism of a seatbelt assembly; and causing, by the processor, the signal to be communicated to the actuator.

15. The method of claim 14, wherein:

the force to be applied to the seatbelt is sufficient to limit a forward movement, in response to the deceleration, of the person wearing the seatbelt to be less than a specific distance; and the specific distance is three inches.

16. The method of claim 14, wherein a measure of the force is proportional to a measure of the deceleration.

17. The method of claim 16, wherein the deceleration:

occurs for a duration of time, and varies during the duration of time.

18. A non-transitory computer-readable medium for producing a force to be applied to a seatbelt, the non-transitory computer-readable medium including instructions that when executed by one or more processors cause the one or more processors to:

obtain information associated with an identity of a person wearing the seatbelt;

obtain, in response to a receipt of the information associated with the identity of the person, information about a measure associated with a mass of the person;

receive information about a deceleration of a vehicle;

produce, in response to a receipt of the information about the deceleration of the vehicle, a signal to control an actuator to produce the force, the force being proportional to a measure of the deceleration and the measure associated with the mass of the person, the actuator being different from any of a pretensioner, a load limiter, and a locking mechanism of a seatbelt assembly; and cause the signal to be communicated to the actuator.

* * * * *